(12) United States Patent
Cairo et al.

(10) Patent No.: US 9,926,791 B2
(45) Date of Patent: *Mar. 27, 2018

(54) CERAMIC MATRIX COMPOSITE ARTICLE AND PROCESS OF FABRICATING A CERAMIC MATRIX COMPOSITE ARTICLE

(71) Applicant: GENERAL ELECTRIC COMPANY, Schenectady, NY (US)

(72) Inventors: Ronald Ralph Cairo, Simpsonville, SC (US); Paul Stephen Dimascio, Greer, SC (US); Jason Robert Parolini, Greer, SC (US)

(73) Assignee: General Electric Company, Schenectady, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 14/959,307

(22) Filed: Dec. 4, 2015

(65) Prior Publication Data
US 2016/0084092 A1     Mar. 24, 2016

Related U.S. Application Data

(63) Continuation-in-part of application No. 13/741,565, filed on Jan. 15, 2013, now Pat. No. 9,234,430.

(51) Int. Cl.
| | |
|---|---|
| *F01D 1/02* | (2006.01) |
| *F01D 5/28* | (2006.01) |
| *F01D 9/02* | (2006.01) |
| *F01D 9/04* | (2006.01) |
| *F01D 25/24* | (2006.01) |
| *F01D 25/30* | (2006.01) |

(Continued)

(52) U.S. Cl.
CPC .............. *F01D 5/282* (2013.01); *F01D 5/284* (2013.01); *F01D 9/02* (2013.01); *F01D 9/04* (2013.01); *F01D 25/24* (2013.01); *F01D 25/30* (2013.01); *F02K 1/82* (2013.01); *B29K 2709/04* (2013.01); *F05D 2300/6033* (2013.01); *Y10T 428/1317* (2015.01)

(58) Field of Classification Search
CPC .......... F01D 5/282; F01D 5/284; F01D 5/288; F01D 5/147; F05D 2300/6033; Y10T 428/1317
USPC ........ 416/230, 229 A, 229 R, 232, 233, 224; 415/200; 428/297.1, 297.4, 297.7
See application file for complete search history.

(56) References Cited

U.S. PATENT DOCUMENTS

| | | |
|---|---|---|
| 3,353,932 A | 11/1967 | Shanley |
| 4,504,343 A | 3/1985 | Green |

(Continued)

*Primary Examiner* — Jason Shanske
*Assistant Examiner* — Jason Mikus
(74) *Attorney, Agent, or Firm* — McNees Wallace & Nurick LLC

(57) ABSTRACT

A ceramic matrix composite article and a process of fabricating a ceramic matrix composite are disclosed. The ceramic matrix composite article includes a matrix distribution pattern formed by a manifold and ceramic matrix composite plies laid up on the matrix distribution pattern, includes the manifold, or a combination thereof. The manifold includes one or more matrix distribution channels operably connected to a delivery interface, the delivery interface configured for providing matrix material to one or more of the ceramic matrix composite plies. The process includes providing the manifold, forming the matrix distribution pattern by transporting the matrix material through the manifold, and contacting the ceramic matrix composite plies with the matrix material.

24 Claims, 5 Drawing Sheets

(51) Int. Cl.
    *F02K 1/82*     (2006.01)
    *B29K 709/04*     (2006.01)

(56) References Cited

U.S. PATENT DOCUMENTS

| | | |
|---|---|---|
| 5,344,687 A | 9/1994 | Grimnes |
| 5,567,500 A | 10/1996 | Marshall et al. |
| 2006/0125156 A1 | 6/2006 | Woolhouse |
| 2007/0071941 A1 | 3/2007 | Eleazer et al. |
| 2011/0008574 A1 | 1/2011 | Pearson et al. |

CERAMIC MATRIX COMPOSITE ARTICLE AND PROCESS OF FABRICATING A CERAMIC MATRIX COMPOSITE ARTICLE

CROSS REFERENCE TO RELATED APPLICATIONS

This application is a continuation-in-part of, and claims the benefit of, U.S. patent application Ser. No. 13/741,565, filed Jan. 15, 2013, entitled "Ceramic Matrix Composite Articles and Process of Fabricating a Ceramic Matrix Composite Article," the disclosures of which are incorporated by reference in its entirety.

STATEMENT REGARDING FEDERALLY SPONSORED RESEARCH OR DEVELOPMENT

The United States Government retains license rights in this invention and the right in limited circumstances to require the patent owner to license others on reasonable terms by the terms of Government Contract No. DE-FC26-05NT42643 awarded by the United Stated Department of Energy.

FIELD OF THE INVENTION

The present invention is directed to articles and processes of fabricating articles. More particularly, the present invention is directed to ceramic matrix composite articles and processes of fabricating ceramic matrix composite articles.

BACKGROUND OF THE INVENTION

In order to increase efficiency and performance of gas turbines so as to provide increased power generation, lower emissions and improved specific fuel consumption, turbines are tasked to operate at higher temperatures and under harsher conditions. Such conditions become a challenge for cooling of certain materials.

As operating temperatures have increased, new methods of cooling alloys have been developed. For example, ceramic thermal barrier coatings (TBCs) are applied to the surfaces of components in the stream of the hot effluent gases of combustion to reduce the heat transfer rate and to provide thermal protection to the underlying metal and allow the component to withstand higher temperatures. Also, cooling holes are used to provide film cooling to improve thermal capability or protection. Concurrently, ceramic matrix composites (CMCs) have been developed as substitutes for some alloys. The CMCs provide more desirable temperature and density properties in comparison to some metals; however, they present additional challenges.

Processing laminated composite turbine airfoils, such as with CMCs, has been shown to be effectively executed using melt infiltration (MI). Problems exist, however, when the laminates become thick and/or the geometry becomes complex. These conditions create more problems for the inflow of the matrix material into the fiber laminate resulting in regions of porosity and/or silicon-rich zones, both of which can be initiation sites for crack propagation and ensuing fracture for interlaminar separation.

The problems are especially acute when processing thick sections where the final liquid silicon volumes fail to fill effectively leading to micro-porosity in the matrix. Additionally, thick sections present a thermal inertia which manifests as time-varying solidification fronts where the last-to-solidify regions sometimes do not transform to SiC and instead form undesirable features rich in free silicon (solid). Such features can lead to faster crack-growth rates through the matrix precipitating premature interlaminar failures.

A ceramic matrix composite article and a process of fabricating ceramic matrix composite articles that do not suffer from one or more of the above drawbacks would be desirable in the art.

BRIEF DESCRIPTION OF THE INVENTION

In an exemplary embodiment, a ceramic matrix composite article includes a matrix distribution pattern formed by a manifold and ceramic matrix composite plies laid up on the matrix distribution pattern. The manifold includes one or more matrix distribution channels operably connected to a delivery interface, the delivery interface configured for providing matrix material to one or more of the ceramic matrix composite plies.

In another exemplary embodiment, a ceramic matrix composite article includes a manifold and ceramic matrix composite plies laid up on the manifold. The manifold includes one or more matrix distribution channels operably connected to a delivery interface, the delivery interface configured for providing matrix material to one or more of the ceramic matrix composite plies.

In another exemplary embodiment, a process of fabricating a ceramic matrix composite article includes providing a manifold, the manifold including one or more matrix distribution channels operably connected to a delivery interface, the delivery interface configured for providing matrix material to one or more ceramic matrix composite plies, forming a matrix distribution pattern by transporting the matrix material through the manifold, and contacting the ceramic matrix composite plies with the matrix material.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary ceramic matrix composite article and ceramic matrix composite fabrication process. Embodiments of the present disclosure, for example, in comparison to articles and processes without one or more of the features described herein, improve matrix infiltration during fabrication, permit increase in efficiency and performance of turbines, permit ceramic matrix composite materials to be operated at higher temperatures, permit interlaminar flexibility in thick sections of ceramic matrix composite articles for use with melt infiltration, reduce or eliminate premature interlaminar failure, or combinations thereof.

Figure 1:
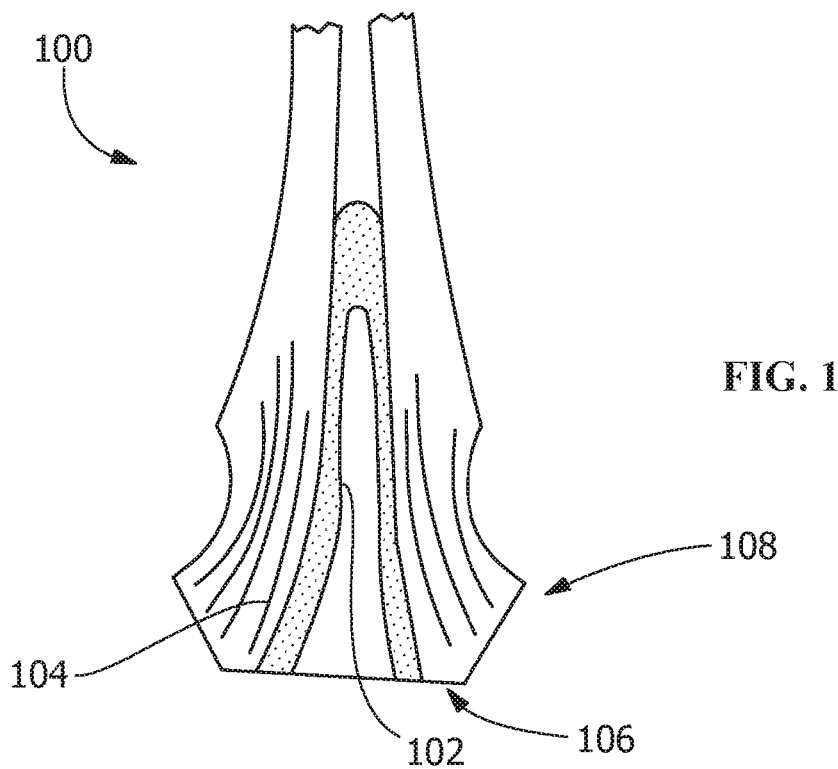
FIG. 1 is a perspective view of an exemplary ceramic matrix composite article according to an embodiment of the disclosure.

Referring to FIG. 1, a ceramic matrix composite article 100 includes a matrix distribution pattern 102 formed by a manifold 200 (see FIGS. 2, 3, 6, 9, and 11) and ceramic matrix composite plies 104 laid up on the matrix distribution pattern 102. In one embodiment, the matrix distribution pattern 102 is devoid or substantially devoid of porosity, devoid or substantially devoid of micro-porosity, devoid or substantially devoid of free silicon, or a combination thereof.

The article 100 is any suitable article susceptible to the drawbacks solved herein. For example, suitable articles include, but are not limited to, a turbine component, a hot gas path component, a wide component, a turbine blade (also known as a bucket), such as, within a high-pressure turbine system, a portion of a dovetail of a blade (hollow or solid), a flange, an airfoil, a platform, a nozzle (also known as a vane), a shroud, a shroud ring, a turbine strut, a combustion liner, a turbine case, an exhaust nozzle flap, a vectoring nozzle component, an exhaust duct, an augmentation liner, a jet exhaust nozzle, or a combination thereof. The manifold is consumable (for example, polymeric, plastic, carbon-based, silicon carbide, silicon-based, oxide-based, or a combination thereof) or non-consumable (for example, a structural spar, a chopped fiber ceramic matrix composite, a mandrel serving to splay, or a combination thereof). The geometry of the manifold 200 corresponds to the specific application for its use. For example, in one embodiment, the manifold 200 is tapered and/or contoured for reducing interlaminar stress. As used herein, a "wide component" is a component having a width dimension greater than about 4 inches, including, for example, certain nozzles, shrouds and combustion liners.

Figure 2:
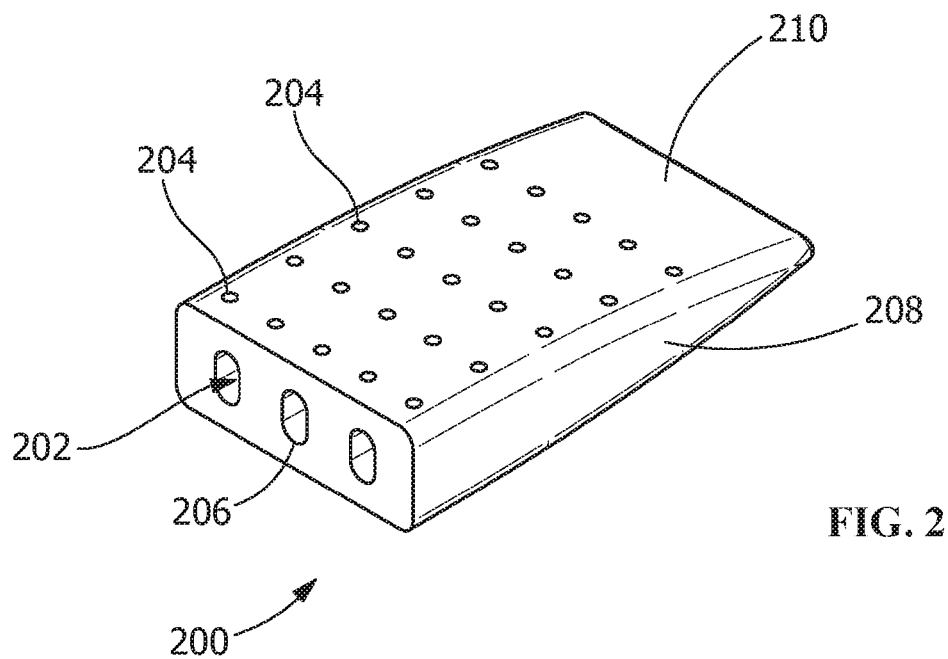
FIG. 2 is a perspective view of a manifold for an exemplary matrix composite article according to an embodiment of the disclosure.
Figure 3:
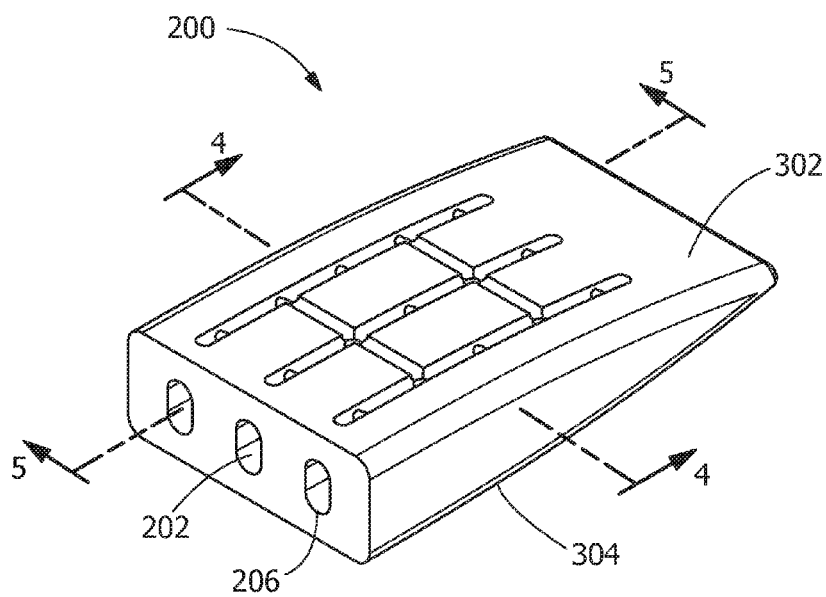
FIG. 3 is a perspective view of a manifold for an exemplary matrix composite article according to an embodiment of the disclosure.

Referring to FIG. 2, the manifold 200 includes one or more matrix distribution channels 202 operably connected to a delivery interface 204, the delivery interface 204 being configured for providing matrix material (not shown) to one or more of the ceramic matrix composite plies 104 (see FIG. 1). As shown in FIG. 2, in one embodiment, the matrix distribution channels 202 are arranged in substantially parallel, slightly converging, or otherwise aligned relationship, extending from the inlet ports 206. As shown in FIG. 3, in one embodiment, the matrix distribution channels 202 are arranged in a substantially orthogonal grid.

The manifold 200 transports fluid and/or liquid, such as the matrix material, to predetermined locations of the ceramic matrix composite article 100, thereby forming the matrix distribution pattern 102 within a laminar network of the ceramic matrix composite plies 104. The liquid is provided, for example, injected, into the manifold 200 through one or more inlet ports 206. In one embodiment, the inlet ports 206 are configured to be positioned proximal to a root 106 proximal to an attachment region 108 of the ceramic matrix composite article 100, wherein the ceramic matrix composite article 100 is a turbine blade. Additionally or alternatively, in one embodiment, the manifold 200 transports silicon capable of forming into SiC. In a further embodiment, at least a portion of the silicon remains as free silicon in the manifold 200, which is capable of being re-melted and/or dissolved by an etchant to form cavities or passages (for example, for cooling) in the manifold 200.

The inlet ports 206 are sized to ensure desired delivery of the matrix material and reduce or eliminate backflow of the matrix material, thereby preventing blockage of flow from the inlet ports 206 to the delivery interface 204. Similarly, the delivery interface 204 and its components are sized to ensure sufficient delivery of the matrix material during processing. In one embodiment, the inlet ports 206, the matrix distribution channel(s) 202, and/or the delivery interface 204 are also arranged and disposed to provide sufficient transverse (through-the-thickness) stiffness and strength to resist the bearing/crush stresses of the attachment region 108 during operation and/or in the ceramic matrix composite article 100, structural integrity, crack energy dissipation, and/or compaction.

In one embodiment, the manifold 200 is a pre-cast insert having chopped fiber ceramic matrix composite material 208 configured for thermo-elastic compatibility with the ceramic matrix composite plies 104. For example, in this embodiment, the manifold 200 provides a layup surface 210 for the ceramic matrix composite plies 104 and a substantially uniform resistance during compaction, thereby reducing or eliminating the formation of porosity and/or wrinkles between the ceramic matrix composite plies 104 and the layup surface 210, forming a contour permitting development of complex geometry as is in the attachment region 108 of a dovetail of a blade, provides controlled separation of suction and pressure sides of blades, provides lateral support for pressure and suction sides of blades, provides vibration and/or strength augmentation, or combinations thereof. In one embodiment, the chopped fiber ceramic matrix composite material 208 provides damage tolerance to the matrix distribution channel(s) 202, the delivery interface 204, the inlet ports 206, or a combination thereof.

Figure 4:
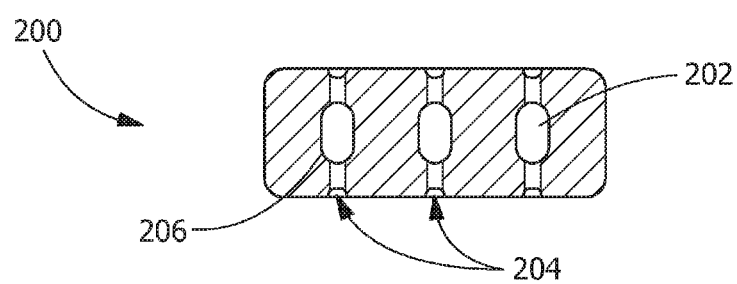
FIG. 4 is a section view along line 4-4 of the manifold shown in FIG. 3.
Figure 5:
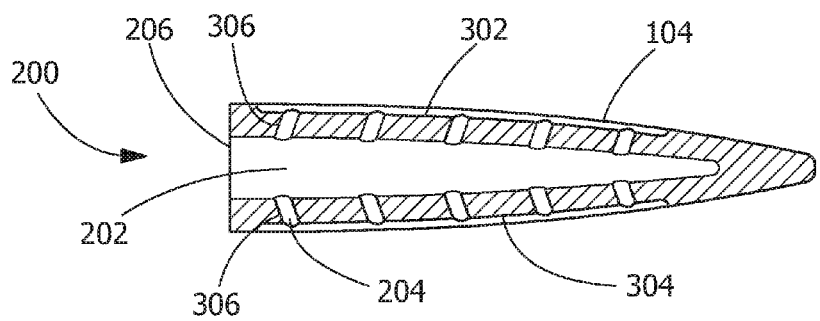
FIG. 5 is a section view along line 5-5 of the manifold shown in FIG. 3.

Referring to FIGS. 3-5, in one embodiment, the matrix distribution channels 202 of the manifold 200 aid in distributing the matrix material from a first surface 302 of the manifold 200 and a second surface 304 on an opposite side of the manifold 200, for example, to the ceramic matrix composite plies as is shown in FIG. 5. The delivery interface 204 includes any suitable openings, apertures, channels, tubes, or other suitable pathways. In one embodiment, the delivery interface 204 includes features (for example, perforations) for preventing clogging during filling, especially in filling thick parts where normal capillarity is insufficient for flow from the delivery interface 204.

In one embodiment, the delivery interface 204 includes apertures 306 having predetermined dimensions, such as a predetermined maximum dimension 308 (for example, as a diameter), a predetermined length 310, a predetermined orientation (for example, being curved, being sloped, being perpendicular, being equally spaced, being differentially spaced, or a combination thereof). In one embodiment, one or more of the apertures 306 has a predetermined angle α, such as, between about 10 degrees and about 60 degrees, between about 10 degrees and about 45 degrees, between about 10 degrees and about 30 degrees, between about 10 degrees and about 15 degrees, or any suitable combination, sub-combination, range, or sub-range therein.

In one embodiment, the apertures 306 are arranged and disposed to provide the matrix material at amounts differing based upon the position of the apertures 306. In one embodiment, the apertures 306 positioned closer to the root 106 and/or at thicker sections are configured to provide a different amount of the matrix material to the ceramic matrix composite plies 104 in comparison to the apertures 306 positioned distal from the root 106 and/or at thinner sections. For example, the thicker sections closer to the root 106 include the apertures 306 being larger to fill a larger volume than the thinner sections positioned distal from the root 106, which include the apertures 306 being smaller to fill a smaller volume. In one embodiment, flow of the apertures 306 is differentially regulated such that the matrix material flows to the ceramic matrix composite plies 104 in a substantially uniform manner. The number, spacing and size of the apertures 306 is proportional to the volume of the ceramic matrix composite plies 104 the apertures 306 are supplying.

For example, in one embodiment, a blade shank having a thickness of about 1 inch has between about 12 and about 20 holes of a pre-determined diameter. In another embodiment, a blade shank having a thickness of about 0.5 inches has between about 6 and about 10 holes of the pre-determined diameter. In a further embodiment, a blade shank having a thickness of about 0.5 inches has between about 12 and about 20 holes having about half of the pre-determined diameter.

Also for example, in another embodiment, a shroud having a width of about 6 inches and a thickness of about 0.4 inches has between about 12 and about 20 holes of a pre-determined diameter. In another embodiment, a shroud having a width of about 6 inches and a thickness of about 0.2 inches has between about 8 and about 14 holes of the pre-determined diameter. In a further embodiment, a shroud having a width of about 6 inches and a thickness of about 0.6 inches has between about 16 and about 28 holes of the pre-determined diameter.

Also for example, in yet another embodiment, a nozzle having a maximum chordal thickness of 1 inch has between about 12 and about 20 holes of a pre-determined diameter. In another embodiment, a nozzle having a maximum chordal thickness of 0.5 inches has between about 8 and about 16 holes of the pre-determined diameter. In a further embodiment, a nozzle having a thickness of 1.5 inches has between about 18 and about 30 holes of the pre-determined diameter.

Figure 12:
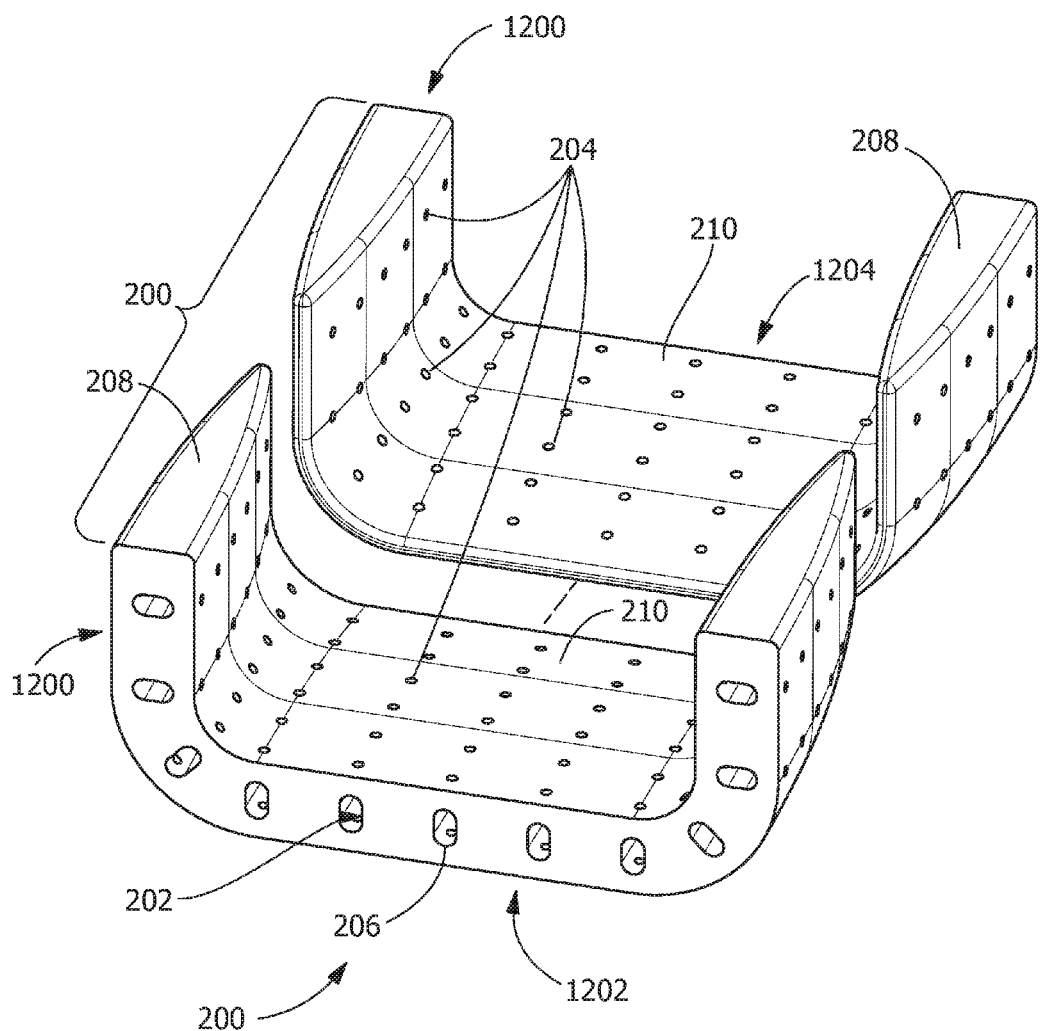
FIG. 12 is a perspective view of a manifold for an exemplary matrix composite article according to an embodiment of the disclosure.

The manifold 200 may include any suitable conformation for a ceramic matrix composite article 100. Referring to FIG. 12, in one embodiment, the manifold 200 includes a plurality of sub-manifolds 1200. A manifold 200 including a plurality of sub-manifolds 1200 may be suitable for a ceramic matrix composite article 100 which is a wide component, as the width of the wide component may inhibit the effectiveness of a manifold 200 lacking a plurality of sub-manifolds 1200. As shown in FIG. 12, a manifold 200 including a conformation suitable for a turbine shroud may include a first sub-manifold 1202 and a second sub-manifold 1204. Any suitable number of sub-manifolds 1200, including three or more may also be included depending on the conformation and the size of the ceramic matrix composite article 100. Further, the delivery interface 204 may be configured for optimized distribution of matrix material to particular portions of the ceramic matrix composite article 100, such as, by way of example, curved portions of the ceramic matrix composite article 100.

Figure 6:
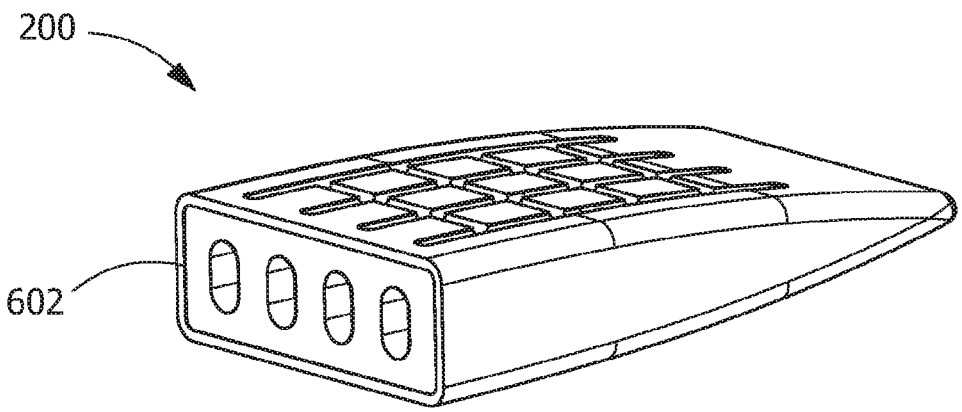
FIG. 6 is a perspective view of a manifold for an exemplary matrix composite article according to an embodiment of the disclosure.
Figure 7:
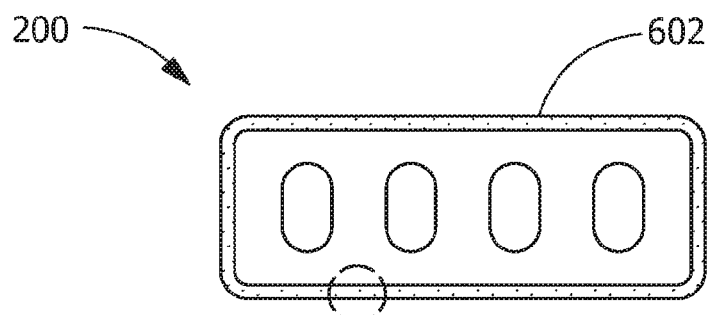
FIG. 7 is an end view of the manifold shown in FIG. 6.
Figure 8:
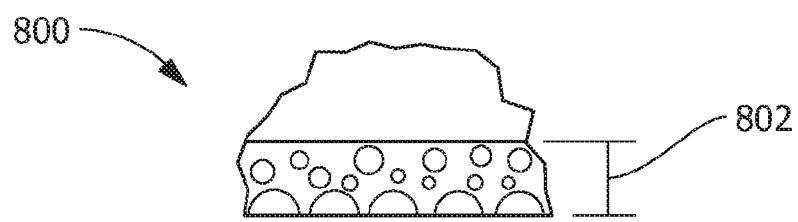
FIG. 8 is a schematic view of an enlarged region 800 shown in FIG. 7.

Referring to FIGS. 6-8, in one embodiment, the manifold 200 includes an outer layer 602. The outer layer 602 is any suitable layer for interlocking the manifold 200 with the ceramic matrix composite plies 104, for example, a pre-processed ceramic matrix composite material (not shown) providing interlaminar integrity by providing shear ties. The outer layer 602 completely extends around the manifold 200 or around a portion of the manifold 200. The outer layer 602 has any suitable thickness 802 capable of providing desired interlaminar integrity, as is shown in the enlarged region 800 of the manifold 200 in FIG. 8.

Figure 9:
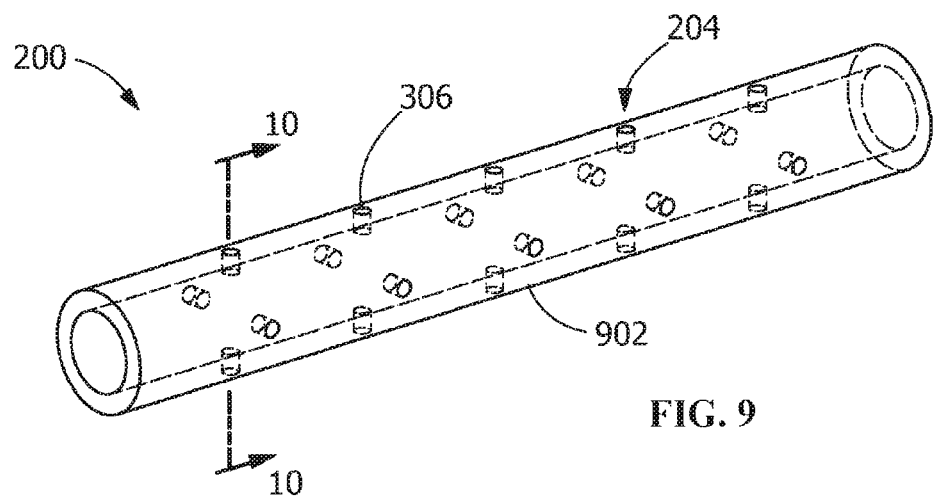
FIG. 9 is a perspective view of a manifold for an exemplary matrix composite article according to an embodiment of the disclosure.
Figure 10:
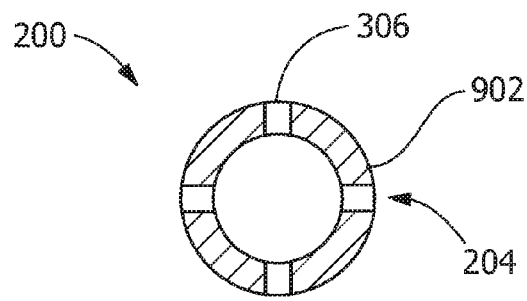
FIG. 10 is a section view along line 10-10 of the manifold shown in FIG. 9.
Figure 11:
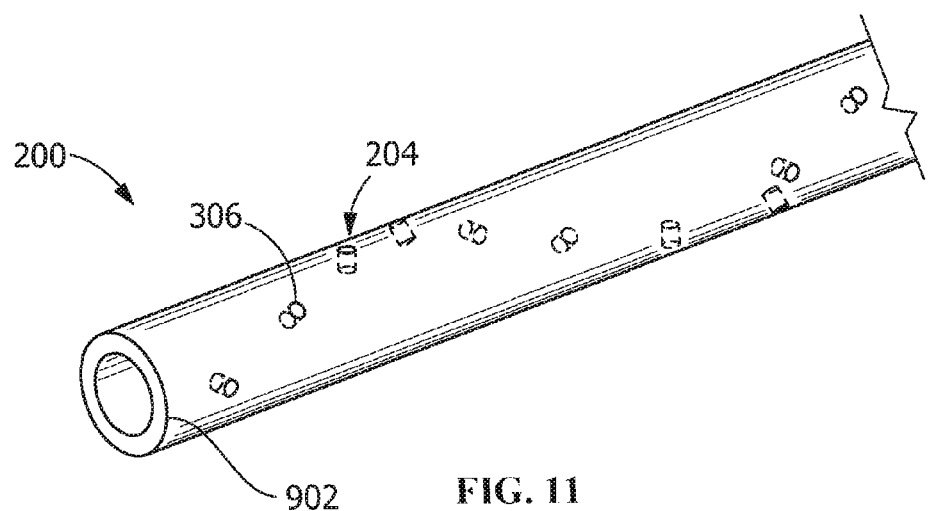
FIG. 11 is a perspective view of a manifold for an exemplary matrix composite article according to an embodiment of the disclosure.

Referring to FIGS. 9-11, in one embodiment, the manifold 200 is a tube 902, such as a silicon carbide tube, a ceramic matrix composite tube, a carbon plus silicon carbide fiber preform, a carbon plus carbon fiber perform, or a combination thereof. The tube includes any suitable structure, such as, having a continuous uni-axial or chopped fiber reinforced structure. In one embodiment, the manifold 200 includes the apertures 306 positioned on the tube 902 being arranged orthogonally, as is shown in FIGS. 9-10, spirally, as is shown in FIG. 11, or with any other suitable arrangement.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite article, comprising:
   a matrix distribution pattern formed by a manifold; and
   ceramic matrix composite plies laid up on the matrix distribution pattern;
   wherein the manifold includes one or more matrix distribution channels operably connected to a delivery interface, the delivery interface configured for providing matrix material to one or more of the ceramic matrix composite plies;
   wherein the article is a turbine component.

2. The article of claim 1, wherein the manifold is a consumable insert.

3. The article of claim 1, wherein the matrix distribution pattern is devoid of micro-porosity.

4. The article of claim 1, wherein the manifold includes chopped fibers in a material defining the one or more matrix distribution channels.

5. The article of claim 1, wherein the manifold includes a plurality of sub-manifolds.

6. The article of claim 5, wherein the plurality of sub-manifolds includes a first sub-manifold and a second sub-manifold.

7. The article of claim 1, wherein the turbine component is selected from the group consisting of a wide component, a shroud, a nozzle, a combustion liner, a turbine case, a shroud ring, a turbine strut, an exhaust duct, an augmentation liner, a jet exhaust nozzle, an exhaust nozzle flap, a vectoring nozzle component, and combinations thereof.

8. The article of claim 7, wherein the turbine component is a shroud.

9. The article of claim 1, wherein the one or more matrix distribution channels are substantially parallel.

10. The article of claim 1, wherein the one or more matrix distribution channels slightly converge.

11. The article of claim 1, wherein the one or more matrix distribution channels are arranged in a substantially orthogonal grid.

12. The article of claim 1, wherein the delivery interface includes apertures positioned to deliver the matrix material to the one or more of the ceramic matrix composite plies.

13. The article of claim 1, wherein the manifold further comprises an outer layer positioned between the delivery interface and the one or more of the ceramic matrix composite plies.

14. The article of claim 1, wherein the turbine component is selected from the group consisting of a portion of a dovetail of a blade, a flange, an airfoil, a platform, and combinations thereof.

15. A ceramic matrix composite article comprising:
a manifold; and
ceramic matrix composite plies laid up on the manifold;
wherein the manifold includes one or more matrix distribution channels operably connected to a delivery interface, the delivery interface configured for providing matrix material to one or more of the ceramic matrix composite plies and wherein the article is a turbine component.

16. The article of claim 15, wherein the manifold includes a plurality of sub-manifolds.

17. The article of claim 15, wherein the turbine component is selected from the group consisting of a wide component, a shroud, a nozzle, a combustion liner, a turbine case, a shroud ring, a turbine strut, an exhaust duct, an augmentation liner, a jet exhaust nozzle, an exhaust nozzle flap, a vectoring nozzle component, and combinations thereof.

18. The article of claim 17, wherein the turbine component is a shroud.

19. The article of claim 15, wherein the turbine component is selected from the group consisting of a portion of a dovetail of a blade, a flange, an airfoil, a platform, and combinations thereof.

20. A process of fabricating a ceramic matrix composite article, comprising: forming a matrix distribution pattern by transporting a matrix material through a manifold, the manifold including one or more matrix distribution channels operably connected to a delivery interface, the delivery interface configured for providing matrix material to one or more ceramic matrix composite plies; and contacting the one or more of the ceramic matrix composite plies with the matrix material, wherein the article is a turbine component.

21. The process of claim 20, wherein the manifold includes a plurality of sub-manifolds.

22. The process of claim 20, including fabricating as the turbine component an article selected from the group consisting of a wide component, a shroud, a nozzle, a combustion liner, a turbine case, a shroud ring, a turbine strut, an exhaust duct, an augmentation liner, a jet exhaust nozzle, an exhaust nozzle flap, a vectoring nozzle component, and combinations thereof.

23. The process of claim 22, including fabricating the shroud as the turbine component.

24. The process of claim 20, including fabricating as the turbine component an article selected from the group consisting of a portion of a dovetail of a blade, a flange, an airfoil, a platform, and combinations thereof.

* * * * *